United States Patent [19]

Iwaki et al.

[11] Patent Number: 4,499,390
[45] Date of Patent: Feb. 12, 1985

[54] WATERPROOF STRUCTURE FOR SLIP RINGS OF AN A.C. GENERATOR FOR A CAR

[75] Inventors: Yoshiyuki Iwaki, Himeji; Hideo Imori, Kanzaki; Hitoshi Gotou, Himeji, all of Japan

[73] Assignee: Mitsubishi Denki Kabushiki Kaisha, Tokyo, Japan

[21] Appl. No.: 556,410

[22] Filed: Nov. 30, 1983

[30] Foreign Application Priority Data

Nov. 30, 1982 [JP] Japan .................................. 57-182816

[51] Int. Cl.³ .............................................. H02K 5/10
[52] U.S. Cl. ...................................... 310/88; 310/232
[58] Field of Search .................... 310/71, 68 R, 68 D, 310/88, 89, 232, 239

[56] References Cited

U.S. PATENT DOCUMENTS

| 3,233,130 | 2/1966 | Bates | 310/88 |
| 3,731,126 | 5/1973 | Hagenlocher | 310/88 X |
| 3,919,574 | 11/1975 | Schmuck | 310/88 X |
| 4,341,967 | 7/1982 | Iwaki | 310/88 |
| 4,387,314 | 6/1983 | Iwaki et al. | 310/88 |

FOREIGN PATENT DOCUMENTS 0071252  5/1982  Japan .................................. 310/88

*Primary Examiner*—Mark O. Budd
*Attorney, Agent, or Firm*—Oblon, Fisher, Spivak, McClelland & Maier

[57] ABSTRACT

An a.c. generator for a car comprises a waterproof cylinder made of a plastic resin which covers the outer periphery of slip rings, a first flat plate to separate and insulate an external terminal from a bracket, and a second flat plate extending toward a rectifier with a predetermined gap between the second flat plate and the rectifier.

2 Claims, 5 Drawing Figures 4,499,390

WATERPROOF STRUCTURE FOR SLIP RINGS OF AN A.C. GENERATOR FOR A CAR

BACKGROUND OF THE INVENTION

1. Field of the Invention

The present invention relates to a waterproof structure for slip rings of an a.c. generator for a car.

2. Description of the Prior Art

Heretofore, in order to protect slip rings of the generator of this kind from water, a cylindrical portion is formed integrally with a part of a rear bracket by casting. There has, however, been caused problems such that entrance of a metallic foreign substance into the interior of the generator may result in short-circuit between a part, such as a rectifier, charged with a positive potential and the cylindrical portion thereby causing a burning accident. Also, entrance of salt water rusts the cylindrical portion or causes elution of a part of the metallic body with the positive potential whereby the eluted substance deposits on the cylindrical portion to cause an accident of short-circuit.

SUMMARY OF THE INVENTION

It is an object of the present invention is to overcome the disadvantages of the conventional construction and to provide a waterproof structure for slip rings of an a.c. generator for a car, which comprises a waterproof cylinder made of a plastic resin covering the other periphery of the slip rings, a first flat portion to separate and insulate an external terminal and a second flat portion extending toward a rectifier with a predetermined gap between the rectifier and the second flat portion.

BRIEF DESCRIPTION OF DRAWING

Various other objects, feature and attendant advantages of the present invention will be more fully appreciated as the same becomes better understood from the following detailed description when considered in connection with the accompanying drawings in which like reference numerals designate like or corresponding parts throughout the several views and wherein.

DETAILED DESCRIPTION OF THE PREFERRED EMBODIMENTS

An embodiment of the present invention will be described with reference to drawing.

Figure 1:
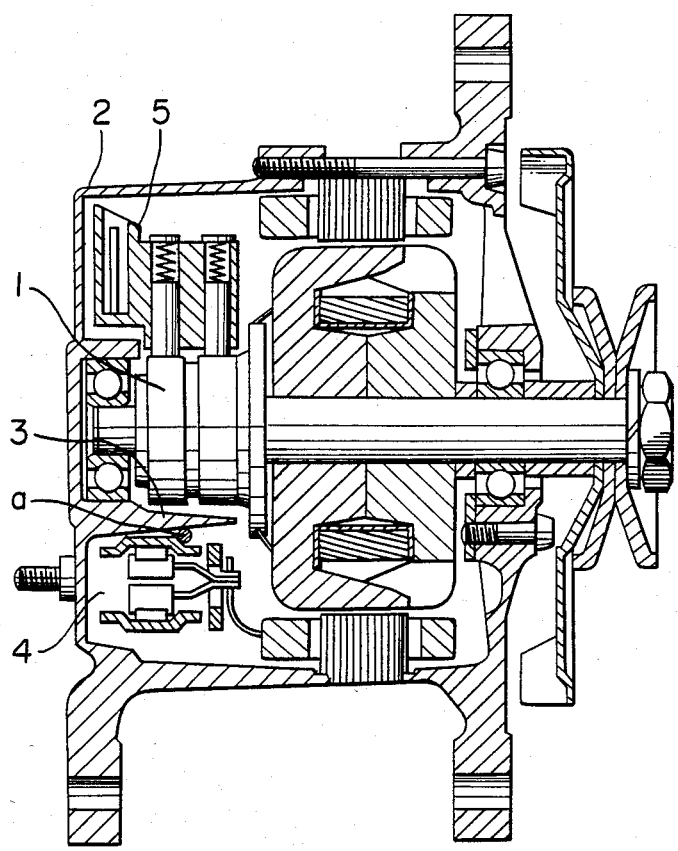
FIG. 1 is a longitudinally cross-sectional view of the conventional a.c. generator for a car.
Figure 2:
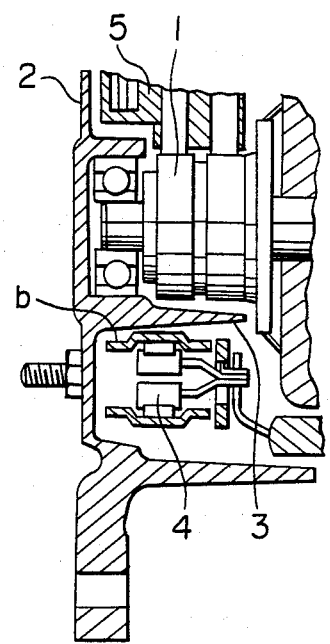
FIG. 2 is a cross-sectional view, partly omitted, similar to that of FIG. 1 in which there is shown a short-circuit condition of a rectifier due to entrance of salt water.

First of all, an example of the conventional a.c. generator is shown in FIGS. 1 and 2 wherein the reference numeral 1 designates a slip ring, 2 designates a rear bracket which supports a stator and a rotor in association with a front bracket (not shown), 3 designates a cylindrical part, 4 designates a rectifier, and 5 designates a brush holder. The symbol (a) designates a foreign substance strayed into the interior of the generator.

FIG. 2 shows such condition that salt water fills in the gap between the rectifier 4 and the cylindrical part 3 and a short-circuit takes place by elution and precipitation.

Figure 3:
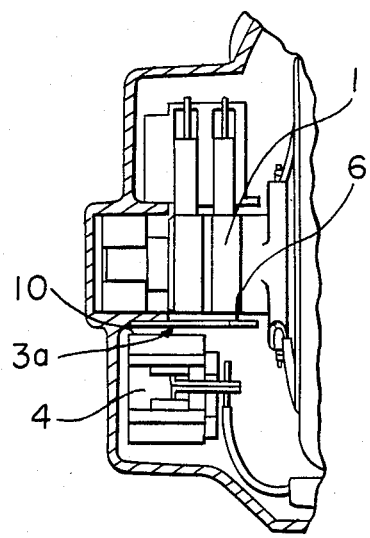
FIG. 3 is a longitudinally cross-sectional view, partly omitted, of an embodiment of the a.c. generator for a car of the present invention.
Figure 4:
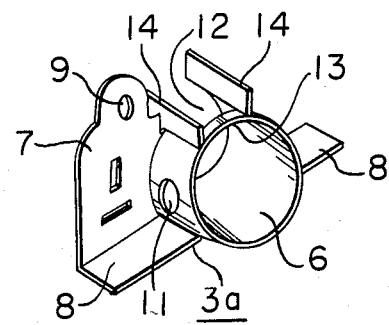
FIG. 4 is a perspective view of an embodiment of the waterproof cylinder of the present invention.
Figure 5:
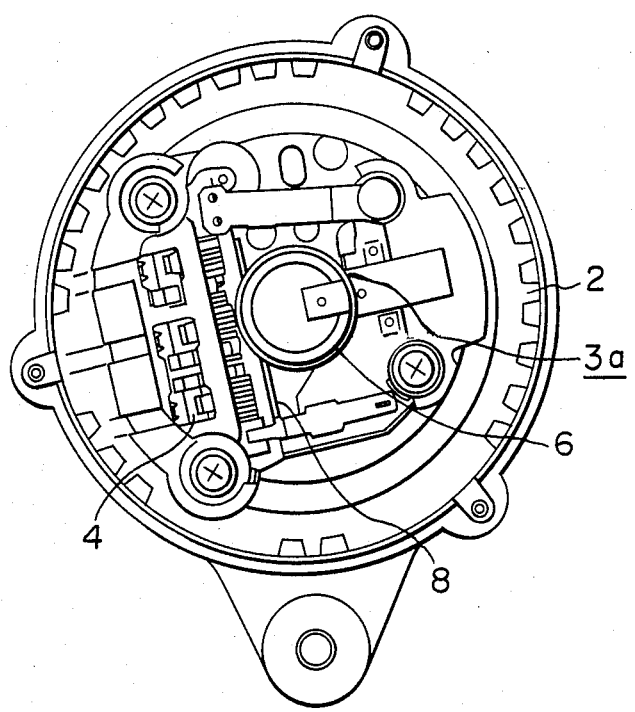
FIG. 5 is a front view of an embodiment of the present invention, in which a cover is removed.

FIGS. 3 and 4 show an embodiment of the present invention. A waterproof cylinder 3a, which corresponds to the cylindrical part 3 of the conventional structure, has a cylindrical portion 6 surrounding the slip rings 1 and a substantially rectangular opening 12 remaining a slim bridge 13 at an edge of the cylindrical portion. Brushes are inserted through the rectangular opening into the cylindrical portion to be brought into contact with the slip rings. A pair of up-right pieces 14, 14 vertically extend from both side edges of the rectangular opening 14 to cover the side surfaces of the brushes. The up-right piece 14 may be formed either one side of the rectangular opening 14 as far as it is sufficient to protect the brushes. A drain hole 11 is formed at the lower part of the cylindrical portion 6. The waterproof cylinder 3a is formed by resin-molding. A first flat plate 7 is provided at the other end of the waterproof cylinder 3a so that the surface of the flat plate 7 is substantially perpendicular to the axial line of the cylinder and the end opening of the cylinder is not closed. The first flat plate 7 is made of a resinous material and is provided with a fitting hole 9 through which the first flat plate 7 is fastened to the rear bracket 2 together with a brush holder 5. The first flat plate 7 also functions to insulate an external terminal from the rear bracket 2. A second flat plate 8 extends from the lower part of the first flat plate 7 substantially at the right angle and extends laterally from the lower part of the cylindrical portion 6 of the waterproof cylinder 3a. The second flat plate 8 faces the inner side 10 of the rectifier 4 with a predetermined gap whereby cooling air can be passed through the gap to obtain effect of cooling the rectifier 4. The second flat plate 8 can be formed in one-piece with the first flat plate 7. It is possible to form the both flat plates 7, 8 and the waterproof cylinder in one piece.

With the construction of the embodiment of the present invention, there is caused no short-circuit accident even though a metallic foreign substance gets in between the waterproof cylinder and the rectifier. Further, there is caused no short-circuit even though salt water enters because leakage current does not flow, hence a metal part of the rectifier is not eluted. The drain hole provided at the lower part of the cylindrical portion prevents the stay of salt water even though it enters into the interior of the generator.

What is claimed is:

1. An a.c. generator for a motor vehicle, said a.c. generator comprising:

(a) a housing comprising a rear bracket;

(b) a stator disposed in said housing;

(c) a rotor disposed in said housing in operative association with said stator;

(d) slip rings operatively connected to said rotor;

(e) a rectifier disposed in said housing adjacent to said slip rings, said rectifier being mounted on said rear bracket;

(f) an external terminal mounted on said rear bracket;

(g) a brush holder disposed in said housing, said brush holder containing contact brushes in operative contact with said slip rings; and (h) a protective member made of plastic resin, said protective member comprising:

(i) a cylindrical portion which covers the outer periphery of said slip rings, said cylindrical portion having a drain hole formed in the lower part thereof and having a substantially rectangular opening in the upper part thereof which is sized and shaped to permit said contact brushes to pass therethrough with a small clearance therearound;

(ii) a first flat plate in the form of a flange which is perpendicular to said cylindrical portion and which extends outwardly from said cylindrical portion at one end thereof, said first flat plate being provided with a fitting hole through which said first flat plate and said brush holder are fastened to said rear bracket, said first flat plate serving to separate and insulate said external terminal from said bracket;

(iii) a second flat plate extending perpendicularly from the bottom of said first flat plate and laterally from the lower part of said cylindrical portion, said second flat plate being spaced from said rectifier by a small predetermined gap which permits cooling air to pass therethrough to cool said rectifier; and (iv) at least one upright piece extending upwardly from said cylindrical portion at an edge of the rectangular opening therein and covering a side surface of said contact brushes.

2. An a.c. generator as recited in claim 1 wherein said protective member comprises a pair of said upright pieces, one extending upwardly from each of two opposite edges of the rectangular opening in said cylindrical portion and covering opposite side surfaces of said contact brushes.

* * * * *